(12) United States Patent
Frank et al.

(10) Patent No.: US 11,439,056 B2
(45) Date of Patent: Sep. 13, 2022

(54) AIR SEEDER FRAME FORCE CONTROL

(71) Applicant: Precision Planting LLC, Tremont, IL (US)

(72) Inventors: William Frank, Manito, IL (US); Chad Plattner, Tremont, IL (US)

(73) Assignee: Precision Planting, LLC, Tremont, IL (US)

( * ) Notice: Subject to any disclaimer, the term of this patent is extended or adjusted under 35 U.S.C. 154(b) by 777 days.

(21) Appl. No.: 16/341,664

(22) PCT Filed: Oct. 19, 2017

(86) PCT No.: PCT/US2017/057421
§ 371 (c)(1),
(2) Date: Apr. 12, 2019

(87) PCT Pub. No.: WO2018/075788
PCT Pub. Date: Apr. 26, 2018

(65) Prior Publication Data
US 2019/0380259 A1  Dec. 19, 2019

Related U.S. Application Data

(60) Provisional application No. 62/410,742, filed on Oct. 20, 2016.

(51) Int. Cl.
*A01C 5/06* (2006.01)
*A01C 7/20* (2006.01)
(Continued)

(52) U.S. Cl.
CPC .............. *A01C 7/205* (2013.01); *A01C 5/064* (2013.01); *A01C 5/066* (2013.01); *A01C 5/068* (2013.01); *A01C 7/08* (2013.01); *G01L 5/0038* (2013.01)

(58) Field of Classification Search
CPC ......... A01C 5/066; A01C 5/064; A01C 5/068; A01C 7/205
See application file for complete search history.

(56) References Cited

U.S. PATENT DOCUMENTS

| | | |
|---|---|---|
| 4,044,697 A | 8/1977 | Swanson |
| 4,077,478 A | 3/1978 | Neukom |

(Continued)

FOREIGN PATENT DOCUMENTS

| | | |
|---|---|---|
| CA | 2902922 A1 | 3/2016 |
| EP | 129614 B1 | 9/1987 |

(Continued)

OTHER PUBLICATIONS

Exapta Website, UniForce Hydraulic Down Force Drills, accessed Apr. 22, 2019.

(Continued)

*Primary Examiner* — Alicia Torres

(57) ABSTRACT

Described herein are air seeders that have force actuators acting on at least one of the firming implement and closing wheel to adjust for a specified downforce on at least one of the firming implement and the closing wheel. In one example, a seeding implement includes a support arm having a support arm first portion and a support arm second portion. A firming implement support arm is pivotally connected to the support arm second portion at a first pivot at a first end of the firming implement support arm. A firming implement force actuator is pivotally connected to the support arm second portion at a first end of the firming implement force actuator and connected to the firming implement support arm at the second end of the firming implement force actuator.

18 Claims, 12 Drawing Sheets

(51) Int. Cl.
*A01C 7/08* (2006.01)
*G01L 5/00* (2006.01)

(56) References Cited

U.S. PATENT DOCUMENTS

| | | | |
|---|---|---|---|
| 4,624,196 A | 11/1986 | Anderson | |
| 4,760,806 A | 8/1988 | Snyder et al. | |
| 4,913,070 A | 4/1990 | Morrison, Jr. | |
| 5,092,255 A | 3/1992 | Long et al. | |
| 5,425,318 A | 6/1995 | Keeton | |
| 5,868,207 A | 2/1999 | Langbakk et al. | |
| 6,253,692 B1 | 7/2001 | Wendling et al. | |
| 6,389,999 B1* | 5/2002 | Duello | A01C 5/064 111/900 |
| 7,581,503 B2* | 9/2009 | Martin | A01C 5/064 172/555 |
| 8,275,525 B2 | 9/2012 | Kowalchuk et al. | |
| 8,286,566 B2 | 10/2012 | Schilling et al. | |
| 8,550,020 B2 | 10/2013 | Sauder et al. | |
| 8,561,472 B2 | 10/2013 | Sauder et al. | |
| 8,634,992 B2 | 1/2014 | Sauder et al. | |
| 8,924,102 B2 | 12/2014 | Sauder et al. | |
| 9,144,189 B2 | 9/2015 | Stoller et al. | |
| 9,173,339 B2 | 11/2015 | Sauder et al. | |
| 9,288,937 B2 | 3/2016 | Sauder et al. | |
| 2007/0272134 A1 | 11/2007 | Baker et al. | |
| 2008/0184920 A1 | 8/2008 | Thompson et al. | |
| 2009/0078178 A1 | 3/2009 | Beaujot | |
| 2010/0010667 A1 | 1/2010 | Sauder et al. | |
| 2011/0313572 A1 | 12/2011 | Kowalchuk et al. | |
| 2011/0313575 A1 | 12/2011 | Kowalchuk et al. | |
| 2012/0048160 A1* | 3/2012 | Adams | A01C 5/066 111/163 |
| 2012/0255475 A1* | 10/2012 | Mariman | A01C 5/066 111/149 |
| 2013/0118391 A1 | 5/2013 | Gadzella et al. | |
| 2013/0206431 A1 | 8/2013 | Freed | |
| 2014/0116735 A1 | 5/2014 | Bassett | |
| 2014/0224513 A1 | 8/2014 | Van Buskirk et al. | |
| 2015/0181799 A1 | 7/2015 | Beaujot et al. | |
| 2015/0271986 A1* | 10/2015 | Sauder | A01B 63/32 172/180 |
| 2016/0165788 A1 | 6/2016 | Anderson et al. | |
| 2016/0165789 A1 | 6/2016 | Gervais et al. | |
| 2017/0064902 A1 | 3/2017 | Jagow et al. | |
| 2017/0142897 A1 | 5/2017 | Hagny et al. | |
| 2022/0000010 A1 | 1/2022 | Kowalchuk et al. | |
| 2022/0000014 A1 | 1/2022 | Kowalchuk et al. | |
| 2022/0000015 A1 | 1/2022 | Kowalchuk et al. | |

FOREIGN PATENT DOCUMENTS

| | | | |
|---|---|---|---|
| EP | 372901 B1 | 2/1994 | |
| EP | 1285564 B1 | 10/2004 | |
| EP | 2047734 B1 | 9/2014 | |
| EP | 2769609 B1 | 1/2017 | |
| FR | 2540700 A1 | 8/1984 | |
| GB | 2091073 A | 7/1982 | |
| GB | 2104364 A | 3/1983 | |
| RU | 2580449 C2 | 4/2016 | |
| WO | WO-9317545 A1 * | 9/1993 | A01C 5/068 |
| WO | 2009/042238 A1 | 4/2009 | |
| WO | 2017/197274 A1 | 11/2017 | |
| WO | WO-2017197274 A1 * | 11/2017 | A01B 49/027 |

OTHER PUBLICATIONS

Russian Patent Office, Office Action for related RU National Stage Application No. 2019114872, dated Mar. 11, 2020.
Instituto Nacional De La Propiedad Industrial, Office Action for related AR Stage Application No. 20170102909, dated Dec. 10, 2020.
European Patent Office, Search Report prepared for related EP Application No. 17862080.3, dated Apr. 28, 2020.
US International Searching Authority, International Search Report for International Patent Application No. PCT/US2017/057421, dated Jan. 4, 2018.
Dawn Equipment as published @ http://www.dawnequipment.com/Dawn_Rfx-D.html on Oct. 18, 2016.
Seeding and Planting, Dawn Unveils New Technology for Planters, Drills for Spring 2015, Posted Dec. 4, 2014.
John Dobberstein, Seeding and Planting, Exapta Solutions Unveils UniForce Hydraulic DownForce for Deere Drills, posted Dec. 9, 2015.
Exapta Website, UniForce Hydraulic Down Force Drills.

* cited by examiner

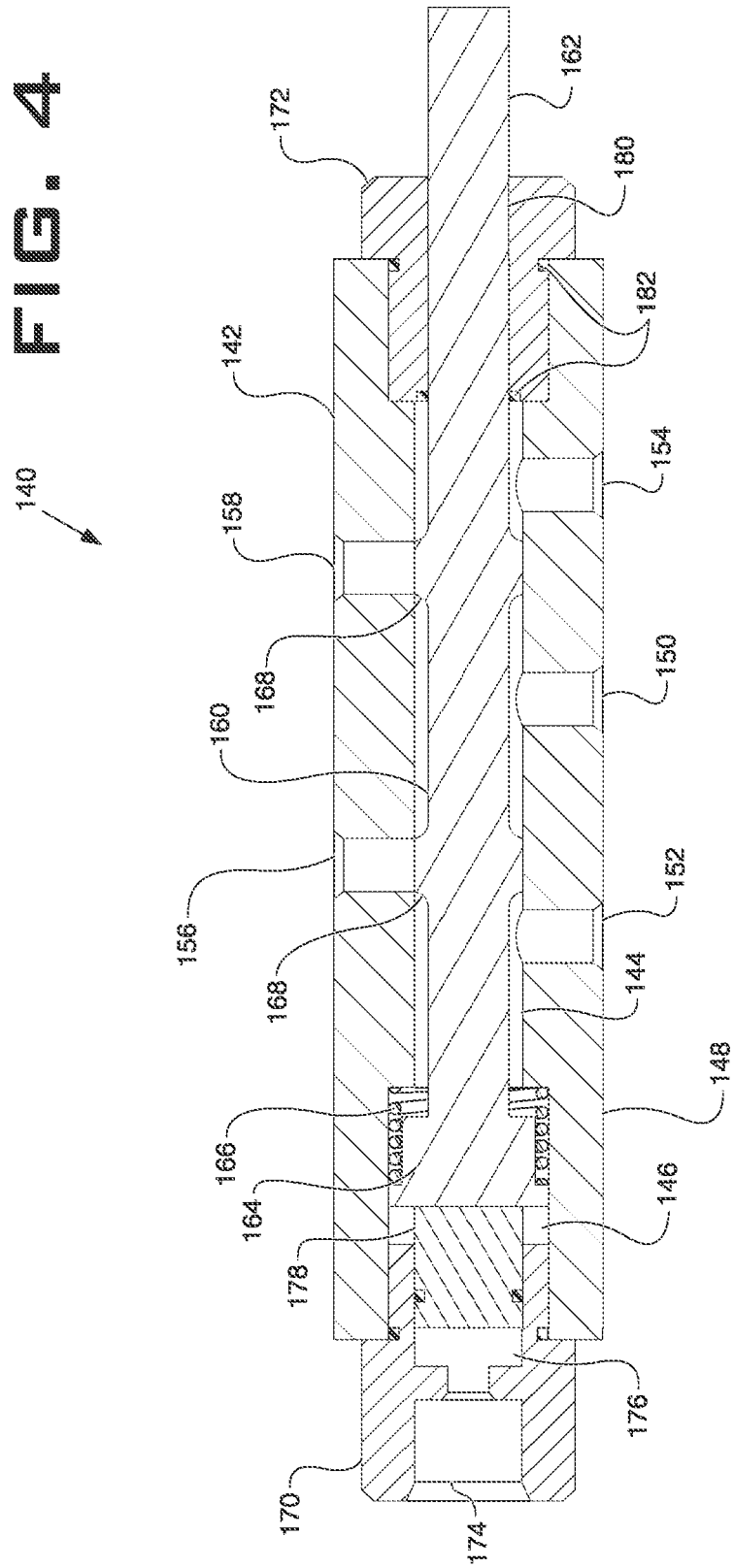

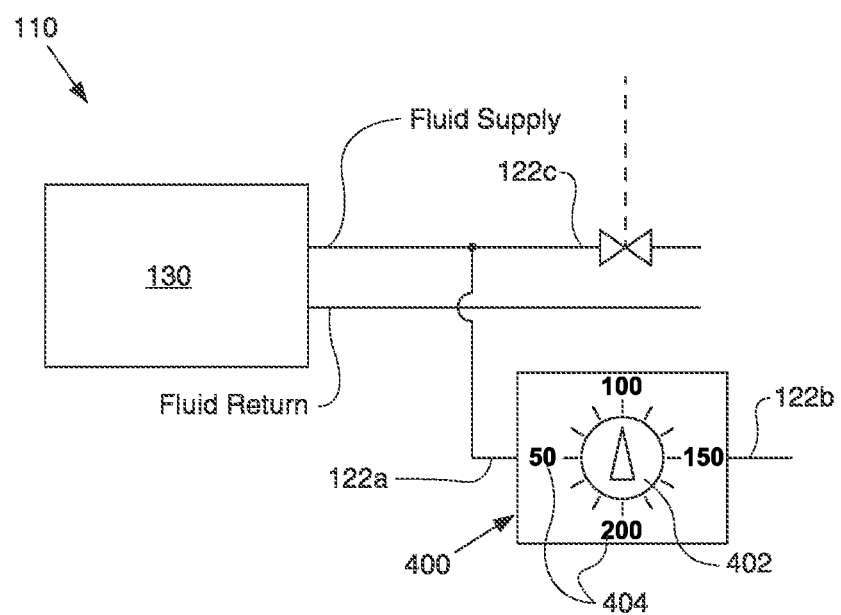

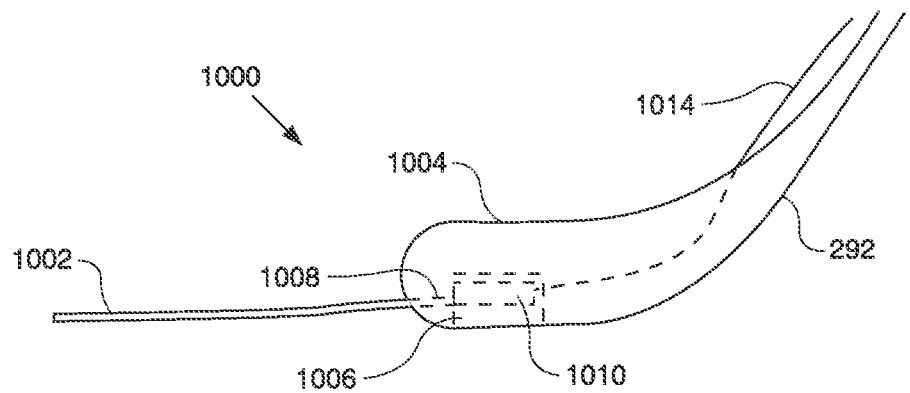
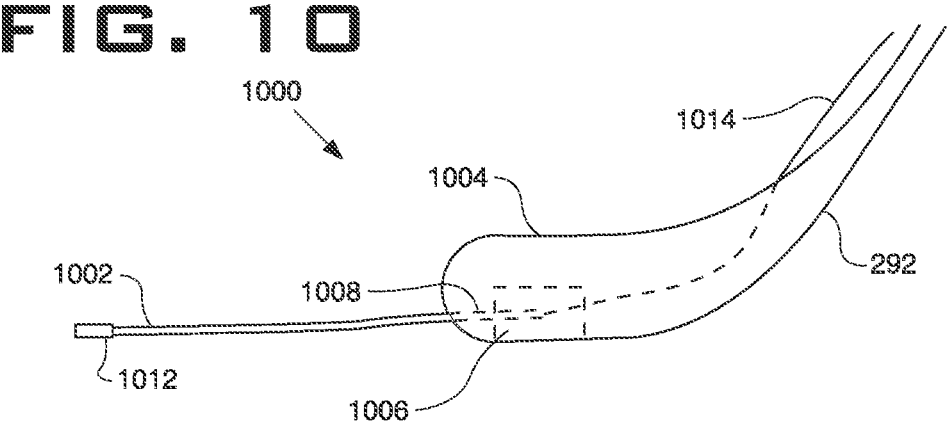
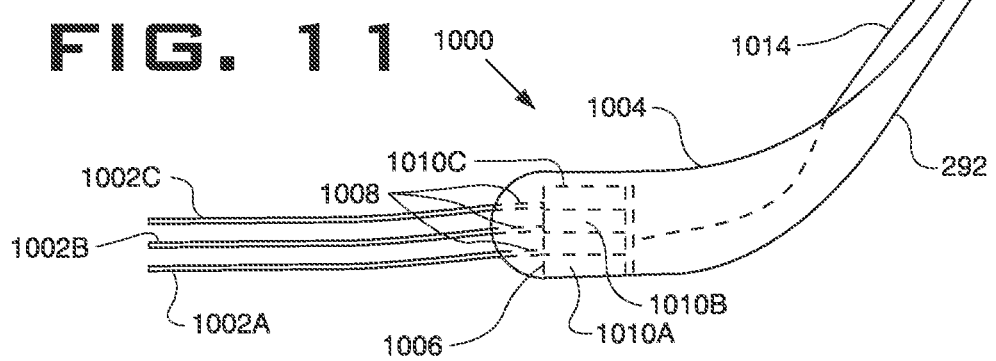

AIR SEEDER FRAME FORCE CONTROL

RELATED APPLICATIONS

This application claims the benefit of U.S. Provisional Application No. 62/410,742, filed on Oct. 20, 2016 entitled: AIR SEEDER PRESS WHEEL AND CLOSING WHEEL FORCE CONTROL.

TECHNICAL FIELD

Embodiments of the present disclosure relate to implements and application units for seed placement by an air seeder.

BACKGROUND

It is recognized that sufficient downforce should be exerted on a seeder to ensure desired furrow depth and soil compaction is achieved. If excessive downforce is applied, especially in soft or moist soils, the soil may be overly compacted, which can affect the ability of germinating seeds to break through the soil. If insufficient downforce is applied, particularly in hard or dry soil, the seeder may ride up and out of the soil resulting in insufficient depth of the furrow. It is known to apply supplemental downforce on the furrow disc of air seeders, but the furrow disc is not the only part of the seeder that affects soil compaction. After the furrow disc, air seeders have a firming implement (e.g., a press wheel) and a closing wheel. These implements have included springs to apply a fixed downforce to the implement.

BRIEF DESCRIPTION OF THE DRAWINGS

The present disclosure is illustrated by way of example, and not by way of limitation, in the figures of the accompanying drawings and in which:

FIG. 4 is a schematic view of an embodiment of a direction control valve for the downforce control system.

FIG. 7 is a schematic illustration of a portion of another embodiment of the closed-loop feedback circuit of FIG. 3 but with the pilot pressure control valve replaced with a manually operated pressure regulating valve.

FIG. 9 is an embodiment of Keeton seed firmer adapted to function as trench closing sensor showing the drag wire coupled to an instrument disposed in the body of the Keeton seed firmer.

FIG. 10 illustrates an embodiment of a trench closing sensor utilizing a pressure transducer coupled to the rearward end of the drag wire.

FIG. 11 illustrates an embodiment of a trench closing sensor with vertically stacked drag wires.

BRIEF SUMMARY

Described herein are systems and implements for control of downforce of the firming implement and/or closing wheel of an air seeder.

DETAILED DESCRIPTION

All references cited herein are hereby incorporated by reference in their entireties. In the event of a conflict in a definition in the present disclosure and that of a cited reference, the present disclosure controls.

Described herein are implements for planting seeds, e.g. air seeders.

Figure 1:
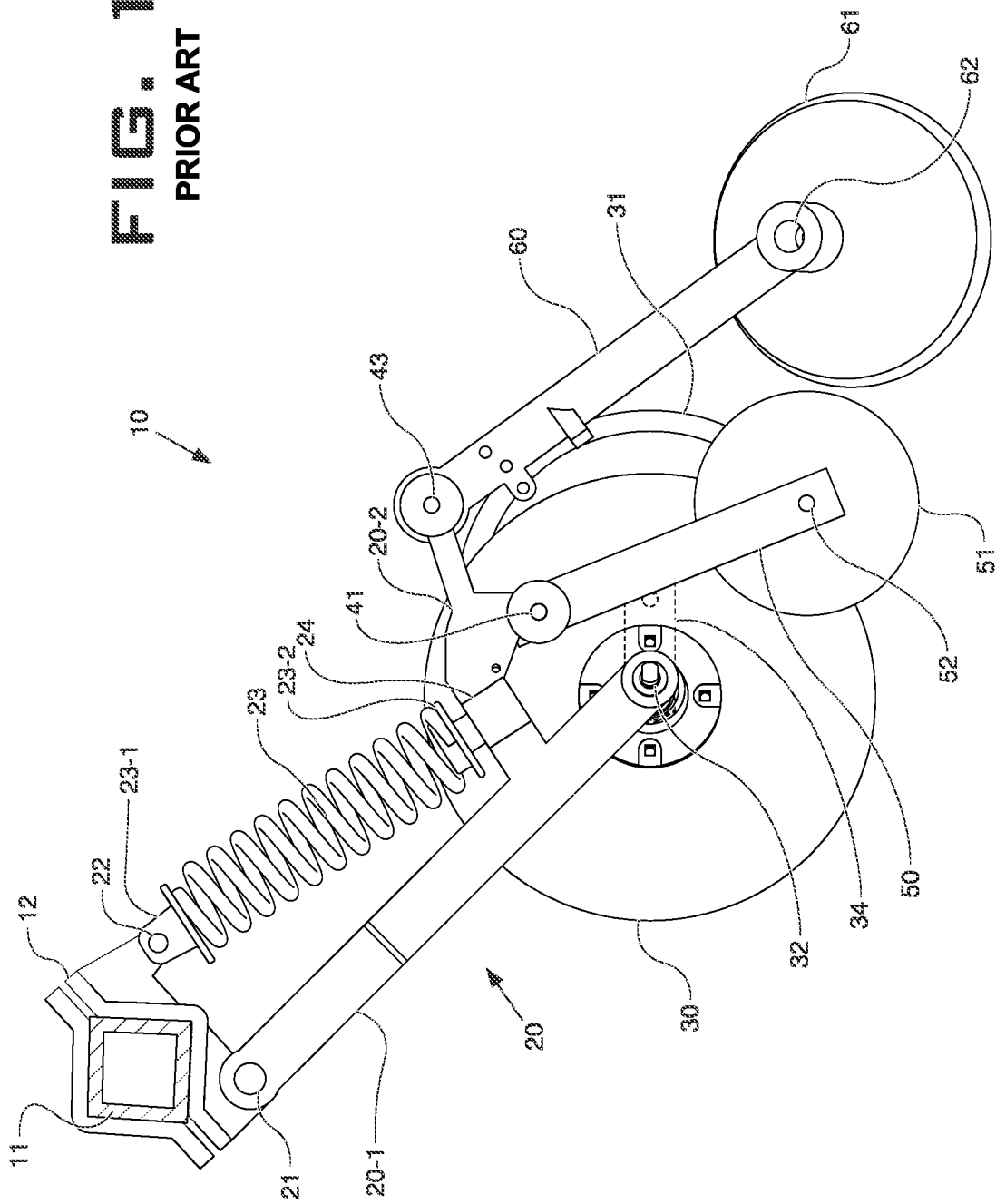
FIG. 1 shows a side view of a prior art air seeder unit.

A prior art air seeder row unit is shown in FIG. 1. Seeding implement 10 is mounted to a frame 11 via bracket 12. A support arm 20 is pivotally connected to the bracket 12 through pivot 21 a first end 20-1-1 of a support arm first portion 20-1. The support arm first portion 20-1 at a second end 20-1-2 opposite the first end 20-1-1 is connected to furrow disc 30 and gauge wheel arm 34 such as through an axle 32. A gauge wheel 31 is connected to gauge wheel arm 34 opposite axle 32. A support arm second portion 20-2 branches from support arm first portion 20-1 and extends away from the support arm first portion 20-1. While typically formed as a unitary piece, support arm 20 can be made from two separate portions 20-1 and 20-2. A force device 23 is pivotally connected to the bracket 12 at pivot 22 at a first end 23-1 and connected to support arm second portion 20-2 at a second end 23-2 at connection 24 on support arm second portion 20-2. Support arm second portion 20-2 has two pivots 41 and 42. A firming implement support arm 50 is pivotally connected to the support arm second portion 20-2 at pivot 41 at a first end 50-1 and to firming implement 51 at a second end 50-2. A closing wheel support arm 60 is pivotally connected to support arm second portion 20-2 through pivot 43 at a first end 60-1 and to closing wheel 61 at a second end 60-2. A closing wheel 61 can be connected to the closing wheel support arm 60 via axle 62.

It would be desirable to control the downforce on the firming implement and closing wheel in accordance with embodiments of the present design.

Figure 2:
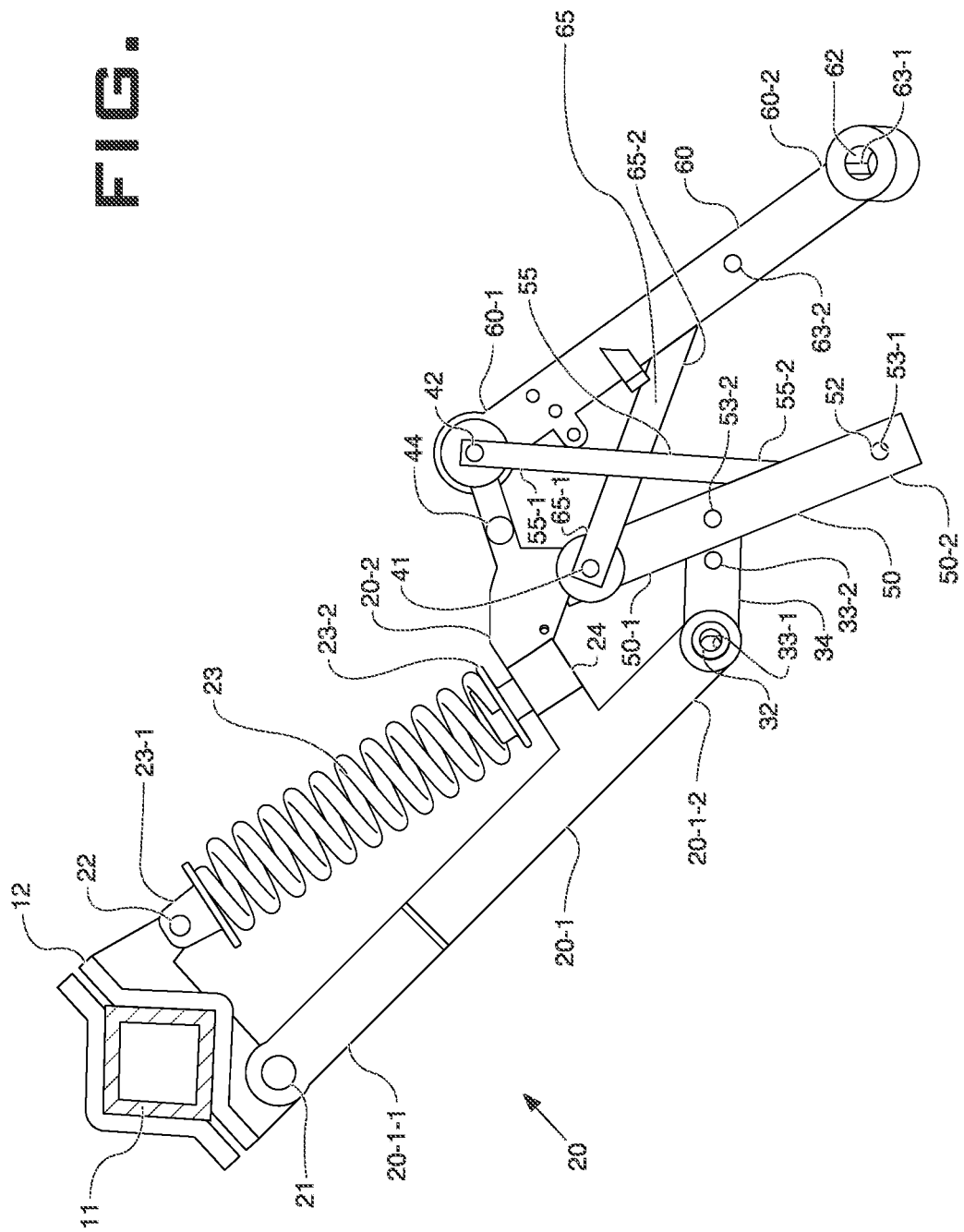
FIG. 2 shows an embodiment with down force actuators disposed to actuate a firming implement support arm and disposed to actuate a closing wheel support arm.

In one embodiment shown in FIG. 2, a firming implement force actuator 55 is pivotally connected to support arm second portion 20-2 through pivot 42 at a first end 55-1 and to firming implement support arm 50 at a second end 55-2. A closing wheel force actuator 65 is pivotally connected to second support arm second portion 20-2 through pivot 41 at a first end 65-1 and to closing wheel support arm 60 at a second end 65-2.

In one embodiment, firming implement force actuator 55 and/or closing wheel force actuator 65 do not need to use existing pivots 41 and 42. Either or both firming implement force actuator 55 and closing wheel force actuator 65 can be pivotally attached at an alternative pivot, such as pivot 44.

The firming implement 51 can be any implement that applies a force to the seeds to urge them into the furrow. In one embodiment, firming implement 51 is a press wheel as shown in FIG. 1. In other embodiments, firming implement 51 is a seed firmer (e.g., as described in U.S. Pat. No. 5,425,318).

The force device 23 can be anything that applies and/or reduces a force between the frame 11 and the furrow disc 30 through the support arm second portion 20-2. Examples include, but are not limited to, springs, hydraulic cylinders, pneumatic cylinders, or electrically driven linkage. Force is transferred from support arm second portion 20-2 to support arm first portion 20-1 then to furrow disc 30.

The firming implement force actuator 55 and/or the closing wheel force actuator 65 are each independently hydraulic cylinders, pneumatic cylinders, or electrically driven linkage. Each actuator 55, 65 are in data communication with a monitor 300.

An electrically driven linkage can be an electric motor that drives a screw to lengthen or shorten the length of the force device 23 or force actuators 55 or 65.

The seeding implement 10 can further include one or more load sensors. A gauge wheel load sensor 33-1 can be disposed at the connection of the support arm 20 and gauge wheel 31. Load sensor 33-2 can also be disposed on arm 34 at an end opposite axle 32. Alternatively, load sensor 33-1 can be disposed at the connection of gauge wheel arm 34 at axle 32. A firming implement load sensor 53-1 can be disposed at the connection of the firming implement support arm 50 and the firming implement 51 or the load sensor 53-2 can be disposed at any location on the arm 50 itself. A closing wheel load sensor 63-1 can be disposed at the connection of the closing implement support arm 60 and the closing wheel 61 or a load sensor 63-2 can be disposed at any location on the arm 60 itself. Load Sensors 33, 53, and 63 are in data communication with monitor 300.

The furrow disc load sensor 33, the firming implement load sensor 53, and the closing wheel load sensor 63 are each independently used to monitor any implement that can measure the load at its location and communicate the load measurement. In one embodiment, the load sensor is a load sensing pin as described in U.S. Pat. No. 8,561,472. In other embodiments, the load sensor is a load cell.

The force device 23 can also apply sufficient force to the support arm second portion 20-2 to counteract forces applied to the support arm second portion 20-2 by the firming implement force actuator 55 and/or the closing wheel force actuator 65 to maintain a specified force on furrow disc 30.

In one embodiment, the firming implement force actuator 55 and/or the closing wheel force actuator 65 are hydraulically actuated. Examples of hydraulic actuation and control can be found in U.S. Pat. Nos. 8,550,020; 8,634,992; 8,924,102; 9,144,189; 9,173,339; and 9,288,937.

Figure 3:
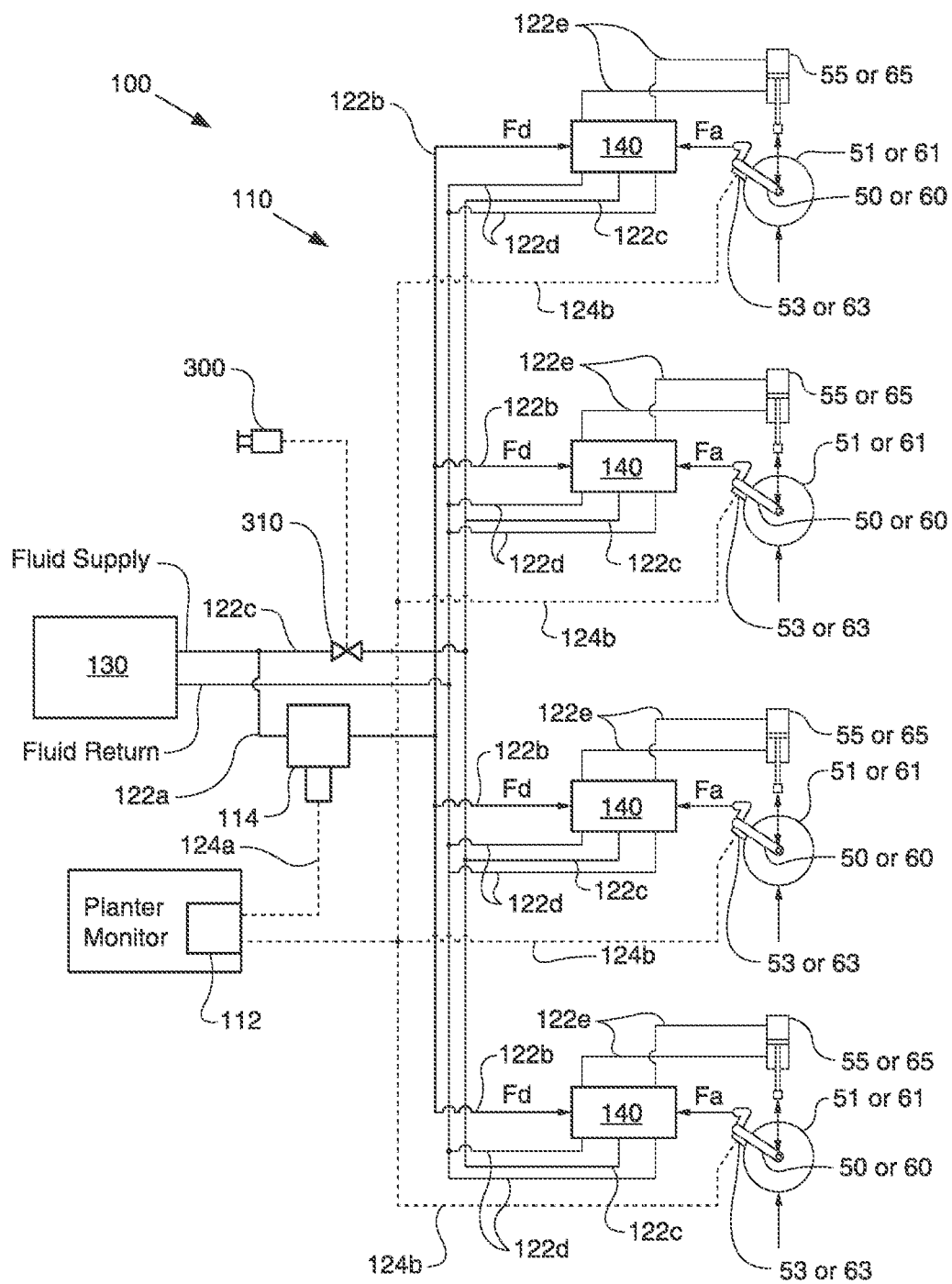
FIG. 3 is a schematic illustration of an embodiment of a closed-loop feedback circuit for downforce control of the firming implement or the closing wheel.

FIG. 3 schematically illustrates an embodiment of a downforce control system 100 which comprises a closed-loop feedback circuit 110 that cooperates with a the firming implement force actuator 55 or closing wheel force actuator 65. The description herein will be for a system for either the firming implement force actuator 55 or the closing wheel force actuator 65 noting that the same system can be used with either one. While described with dual acting cylinders, single acting cylinders that control downforce can be used in place of dual acting cylinders.

In one embodiment, the dynamic system 100 utilizes the hydraulic system of the tractor pulling the air seeder and therefore preferably comprises an electro-hydraulic closed-loop feedback circuit 110 and a dual action or single action hydraulic cylinder 200.

However, the dynamic system 100 may be equally adapted for use with pneumatic actuators in cooperation with any corresponding electro-pneumatic closed-loop feedback circuit.

As used herein, the term "actual downforce of the firming implement or closing wheel, respectively" Fa refers to the dead load, live load and supplemental downforce transferred to the soil through the firming implement 51 or closing wheel 61, respectively, of the air seeder row unit 10.

The firming implement or closing wheel dead load is understood to be the force applied to the ground by the mass of air seeder row unit 10 transferred through the firming implement 51 or closing wheel 61, respectively, and any force applied by force device 23 that acts through firming implement 51 or closing wheel 61, respectively.

The air seeder row unit live load is understood to be the mass of the seed, insecticide and/or fertilizer conveyed by the air seeder row unit 10 and transferred to the ground through the firming implement 51 or the closing wheel 61, respectively.

The term "supplemental downforce," as used herein refers to the loading, other than the live load and dead load that is applied to the firming implement 51 or closing wheel 61 to force the firming implement 51 or the closing wheel 61 downwardly or upwardly relative to the frame 11 to achieve the desired firming or soil compaction under the firming implement 51 or closing wheel 61, respectively.

It should be understood that the supplemental downforce may increase or decrease the downforce Fa.

It should be appreciated that if the firming implement force actuator 55 is extended, the firming implement 51 will be forced downwardly relative to frame 11, resulting in an increase in the supplemental downforce and a corresponding increase in the actual downforce Fa of firming implement 51. If closing wheel force actuator 65 is extended, closing wheel 61 will be forced away from frame 11 resulting in a decrease in the supplemental downforce and a corresponding decrease in the actual downforce Fa of closing wheel 61.

Likewise, if the firming implement force actuator 55 is retracted, the firming implement 51 will be pulled upwardly relative to the frame 11, resulting in a decrease in the supplemental downforce and a corresponding reduction in the actual downforce Fa of the firming implement 51. If the closing wheel force actuator 65 is retracted, closing wheel 61 will be forced closer to frame 11 resulting in an increase in the supplemental downforce and a corresponding increase in the actual downforce Fa of closing wheel 61.

The signal lines 124 communicate electrical signals between the control module 112, the load sensors 53 or 63, the pilot pressure valve 114, and the direction control valve 140.

The fluid lines communicate hydraulic fluid between a fluid source 130, the pilot pressure control valve 114, the direction control valve 140 and the firming implement actuator 55 or closing wheel force actuator 65.

The fluid source 130 is preferably the hydraulic fluid reservoir of the tractor pulling the planter.

It should be appreciated that if the dynamic system 100 is an electro-pneumatic system, the fluid source may be an air compressor, compressed air tank or other suitable air source.

In general, through the control module 112, the operator is able to set the desired downforce Fd, which, in one embodiment, corresponds to the output pressure of the pilot pressure control valve 114.

The control module 112 also preferably permits the operator to view the actual downforce Fa of the row units 10 as detected by the load sensors 53 or 63.

The direction control valve 140 permits fluid flow to and from the individual firming implement force actuator 55 or closing wheel force actuator 65 in response to any imbalance between the desired downforce Fd acting at one end of the direction control valves 140 against the actual downforce Fa acting at the other end of the direction control valves 140.

Thus, the dynamic system 100 independently and dynamically adjusts the supplemental downforce for each firming implement 51 or closing wheel 61 as each firming implement 51 or closing wheel 61 experiences unique loading conditions during planting operations.

The downforce adjustment occurs without the need for complex and expensive central processing circuitry or software programming that would otherwise be required to simultaneously monitor and compare the desired downforce Fd with the actual downforce Fa across all firming implements 51 or closing wheels 61 and to then send signals to independently control the firming implement force actuator 55 or closing wheel force actuator 65 at each firming implement 51 or closing wheel 61.

Although it is preferable for each firming implement 51 or closing wheel 61 to have separate firming implement load sensor 53 or closing wheel load sensor 63 so the operator can monitor the actual gauge wheel downforce for each row, it may be desirable to have load sensors on only certain row units, such as on the outside row units and one or two inner row units.

It should also be appreciated that although it is desirable for each firming implement 51 or closing wheel 61 to have a direction control valve 140, a single direction control valve 140 may be used to control fluid flow to the firming implement force actuator 55 or closing wheel force actuator 65 of multiple air seeder row units 10.

Similarly a single firming implement actuator 55 or closing wheel force actuator 65 may be utilized to control the supplemental downforce across multiple row units.

The pilot pressure control valve 114 is in fluid communication with the fluid source 130 via fluid lines 122a and the direction control valve 140 via fluid lines 122b.

It is also in electrical communication with the control module 112 via signal lines 124a.

The operator is able to set the desired output pressure of the pilot pressure control valve 114 via the control module 112.

Suitable pilot pressure control valves include solenoid-operated proportional valves such as model no. PV72-21 distributed by HydraForce, Inc. in Lincolnshire, Ill., or PDR08P-01 pressure reducing/relieving pilot operated spool type valve from Hydac of Glendale Heights, Ill.

The firming implement load sensor 53 or closing wheel load sensor 63 is disposed to preferably generate an electrical signal corresponding to the actual downforce Fa.

The control module 112 receives the generated signal from the firming implement load sensor 53 or closing wheel load sensor 63 via the signal lines 124b and preferably displays to the operator the actual gauge wheel downforce Fa corresponding to the generated signal.

In a preferred embodiment, the firming implement load sensor 53 or closing wheel load sensor 63 is a strain gauge such as a Wheatstone bridge circuit mounted in any suitable location from which the actual downforce Fa can be reasonably accurately determined.

The control module 112 is preferably integrated into an existing planter monitor that provides a user interface, such as a touch screen, keypad or other input means, through which the operator can select or input the desired downforce Fd.

The control module 112 is also preferably integrated into an existing planter monitor that provides a display screen or other visual display through which the operator can view and monitor the actual gauge wheel downforce Fa of the row units.

In one embodiment, the control module 112 is integrated into the 20/20™ planter monitor system sold by Precision Planting, Inc., of Tremont, Ill. and as disclosed in U.S. Patent Publication No. US2010/0010667.

Those skilled in the art would readily understand how to modify the 20/20™ planter monitor or any other planter monitor to integrate the additional programming and circuitry necessary to allow an operator to input a desired gauge wheel downforce Fd for controlling the output of the pilot pressure valve 114 and to also receive and display the actual downforce Fa as detected by the firming implement load sensor 53 or closing wheel load sensor 63.

Alternatively, as would be recognized by those skilled in the art, the control module 112 may be a standalone system incorporating the necessary circuitry for controlling the output pressure of the pilot control valve 114 corresponding to the desired downforce Fd, and/or for displaying the actual downforce Fa of the row units.

Regardless of whether the control module 112 is integrated into an existing planter monitor system or as a standalone unit, it is preferably mounted in the cab of the tractor in a location where an operator can view and interact with the user interface during planting operations.

Referring to FIGS. 4 and 5A-5C, the direction control valve 140 in one embodiment is a three-position directional control valve similar such as model no. PTS16-12 distributed by Eaton Corporation, Eden Prairie, Minn.

The direction control valve 140 can include a housing 142 having an axial through-bore 144 and an enlarged counter-bore 146.

A series of ports extend transversely through the sidewall 148 of the housing 142 and into the axial through-bore 144, preferably including an inlet port 150, first and second fluid return ports 152, 154, and first and second actuator ports 156, 158.

Figure 5A:
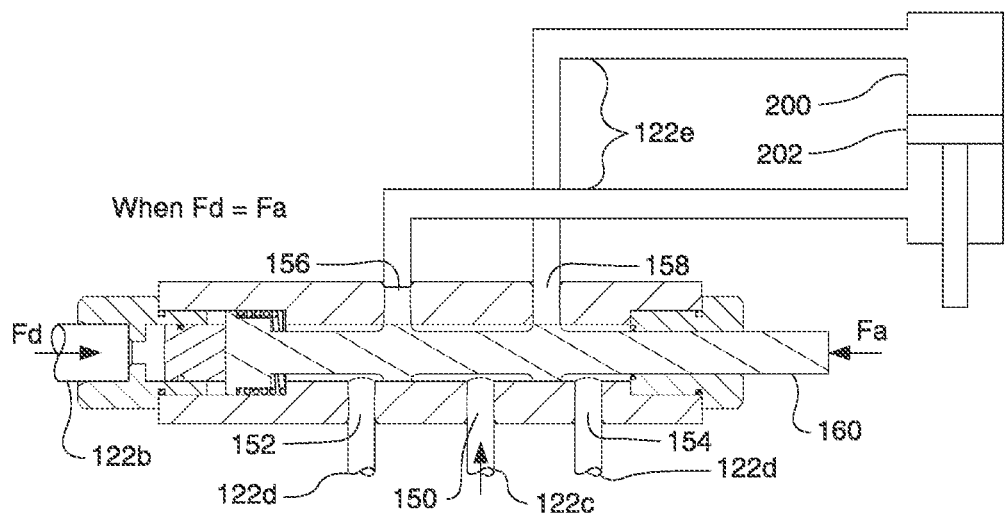
FIGS. 5A-5C illustrate fluid flow and operation of the direction control valve and downforce actuator utilizing fluid pressure from a pilot pressure control valve to impart the desired downforce Fd on either the firming implement or closing wheel in accordance with one embodiment.
Figure 5B:
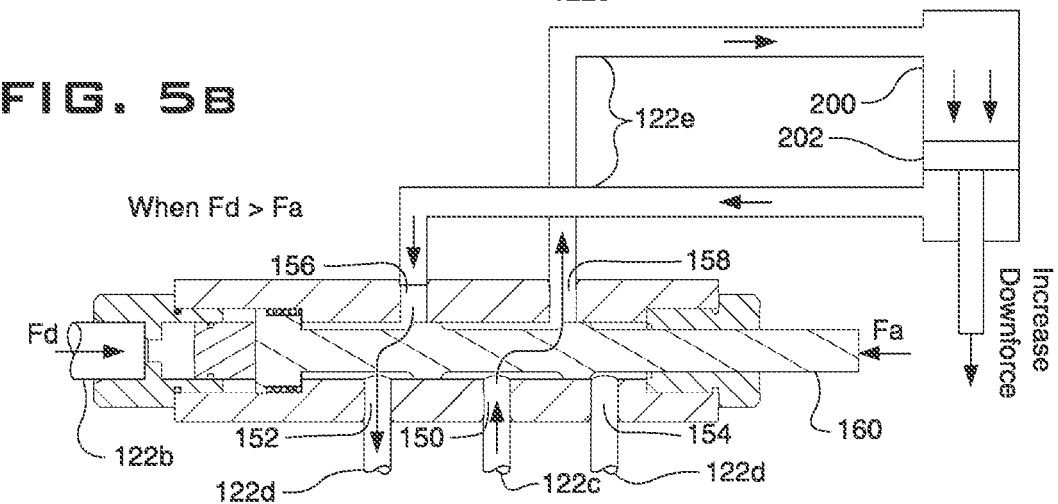
Figure 5C:
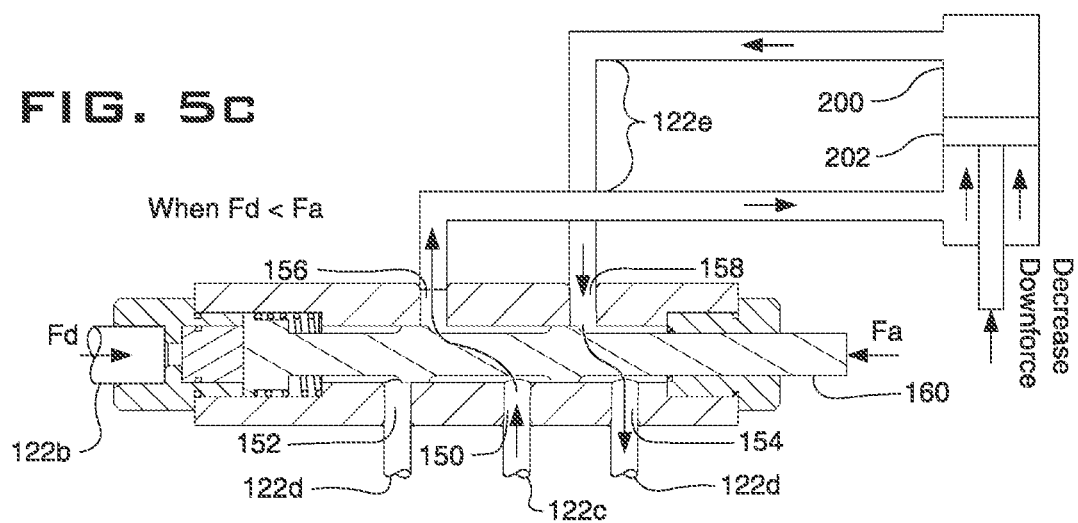

A spool 160 is slidably disposed within the housing 142. The spool 160 has a shaft 162 and an enlarged head 164. The enlarged head 164 is disposed within the counterbore 146. A spring 166 biases the spool head 164 leftward as viewed in FIG. 4. The shaft 162 includes two longitudinally spaced circumferential rings 168. The circumferential rings 168 define raised surfaces, which, when aligned with the first and second actuator ports 156, 158 as shown in FIG. 4 effectively block the flow of fluid into or out of the ports and prevent passage of fluid from one side of the circumferential ring to the other. Thus, as illustrated in FIGS. 5A-5C, the movement of the spool 160 within the through-bore 144 functions as a three position valve.

The direction control valve 140 further includes a head cap 170 and an end cap 172.

The head cap 170 includes an axial end port 174 in fluid communication with an axial counterbore 176.

A block 178 is slidably disposed within the axial counterbore 176 and abuts the spring biased spool head 164.

The end cap 172 has an axial bore 180 through which the distal end of the spool shaft 162 extends. O-rings 182 are provided to fluidly seal the head cap 170 and end cap 172 with the housing 142.

In operation, referring to FIGS. 3, 4 and 5A-5C, fluid lines 122b communicate fluid from the pilot pressure valve 114 to the axial end port 174 of the direction control valves 140 at a pressure corresponding to the desired downforce Fd.

Another set of fluid lines 122c communicate pressurized fluid from the fluid pressure source 130 to the inlet port 150 of each direction control valve 140.

Another set of fluid lines 122d communicate fluid between the fluid return ports 152, 154 back to the fluid source 130.

Another set of fluid lines 122e communicate fluid between the first and second actuator ports 156, 158 to each side of the piston 202 within the firming implement actuator 55 or closing wheel force actuator 65 of each row unit 10.

As depicted in FIG. 5A, if the desired downforce Fd is the same as the actual downforce Fa transmitted by the lever 136 (i.e., Fd=Fa), the circumferential rings 168 on the spool shaft 162 are preferably aligned with the first and second actuator ports 156, 158 thereby preventing fluid flow to and from the firming implement actuator 55 or closing wheel force actuator 65.

As depicted in FIG. 5B, if the desired downforce Fd is greater than the actual downforce Fa transmitted by the lever 136 (i.e., Fd>Fa), the spool shaft 162 will be forced to the right opening fluid communication between the fluid inlet port 150 and the second actuator port 158 and opening fluid communication between the first actuator port 156 and the first fluid return port 152 thereby allowing fluid to flow into the piston end of the firming implement actuator 55 or closing wheel force actuator 65 and out through the rod end of the firming implement actuator 55 or closing wheel force actuator 65 forcing the piston 202 downwardly thereby increasing the actual downforce Fa.

When the actual downforce Fa is sufficiently increased to rebalance with the desired downforce Fd, the spool shaft 162 will return to the position as show in FIG. 5A.

As depicted in FIG. 5C, if the desired downforce Fd is less than the actual downforce Fa transmitted by the lever 136 (i.e., Fd<Fa), the spool shaft 162 will be forced to the left opening fluid communication between the fluid inlet port 150 and the first actuator port 156 and opening fluid communication between the second actuator port 158 and the second fluid return port 154 thereby allowing fluid to flow into the rod end of the firming implement actuator 55 or closing wheel force actuator 65 and out through the piston end of the firming implement actuator 55 or closing wheel force actuator 65 forcing the piston 202 upwardly thereby decreasing the actual downforce Fa.

When the actual downforce Fa is sufficiently decreased to rebalance with the desired downforce Fd, the spool shaft 162 will return to the position as shown in FIG. 5A.

It should be understood that instead of a system that utilizes a pilot pressure control valve 114 to transmit the desired downforce Fd to the direction control valve 140, any suitable electrical or electro-mechanical device may be used to transmit the desired downforce Fd to the direction control valve 140.

Figure 6A:
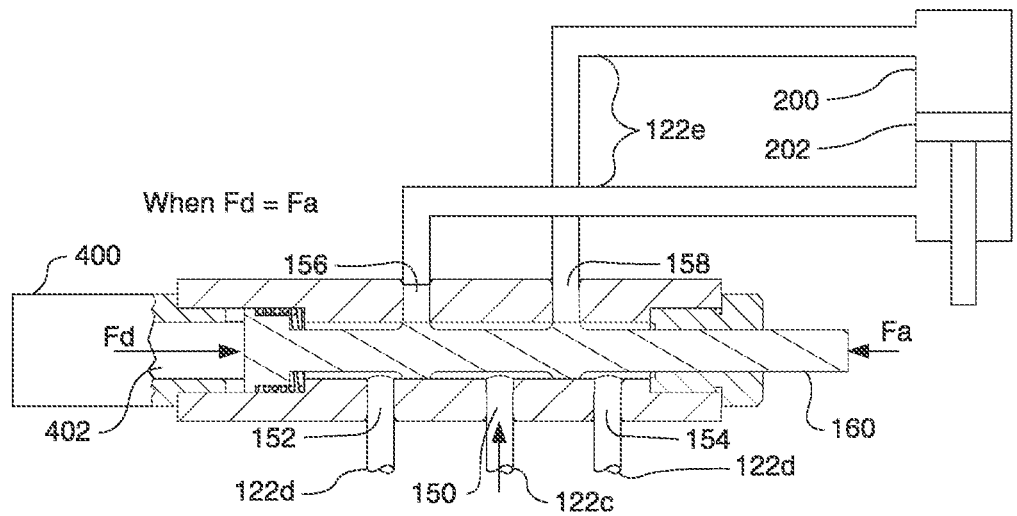
FIGS. 6A-6C illustrate fluid flow and operation of the direction control valve and downforce actuator utilizing a solenoid to impart the desired downforce Fd on either the firming implement or closing wheel in accordance with one embodiment.
Figure 6B:
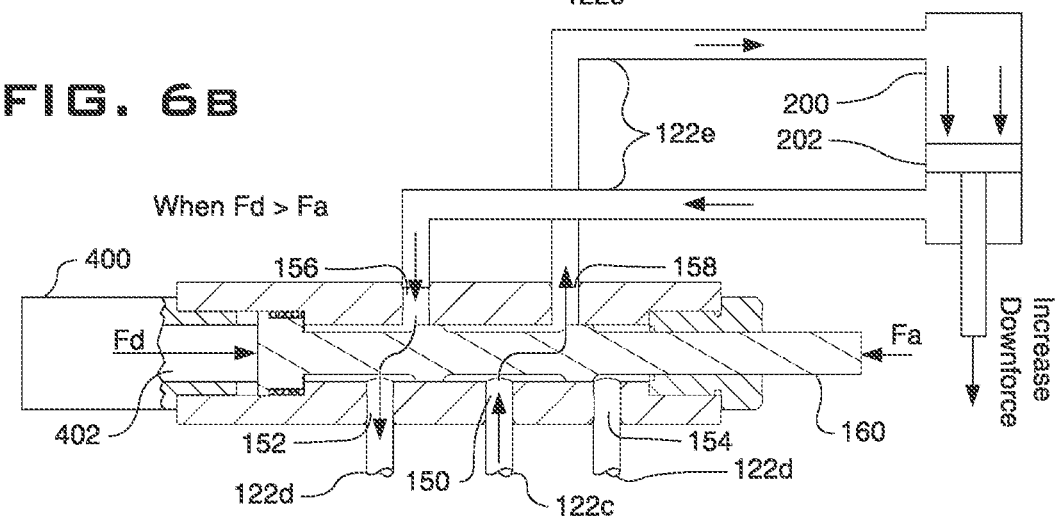
Figure 6C:
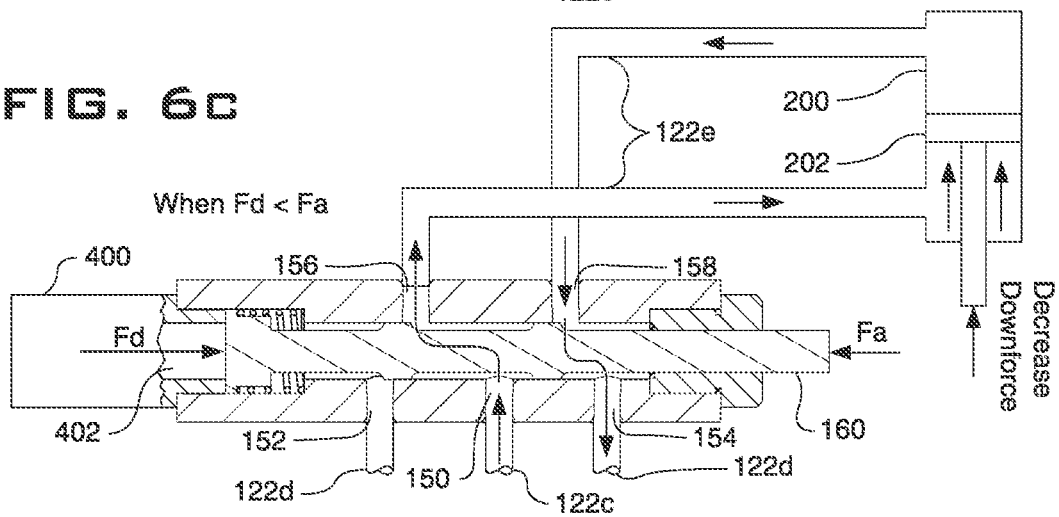

For example, as illustrated in FIGS. 6A-6C, a solenoid 400 may be employed to transmit the desired downforce Fd against spool head 164.

In such an embodiment, the control module 112 would send an electrical signal to the solenoid 400 to cause the solenoid plunger 402 to be displaced corresponding to the desired downforce Fd which in turn acts upon the spool head 164 causing the corresponding displacement of the spool 160 to open and close the ports as described and illustrated in connection with FIGS. 5A-5B.

It should also be understood that the term "direction control valve" 140 should not be construed as being limited to the embodiment described and illustrated herein, but should instead be understood to include any device or combination of devices that allows fluid flow to and/or from the firming implement actuator 55 or closing wheel force actuator 65 when the actual downforce Fa becomes imbalanced with the desired downforce Fd.

Because the firming implement 51 or closing wheel 61 may occasionally encounter rocks or other obstructions during planting operations that may cause high impact forces, the direction control valve 140 is preferably mounted in a manner to avoid damage from the impact forces.

For example, the direction control valve 140 is preferably bias mounted to allow the control valve 140 to displace longitudinally if an abrupt force imposed by the lever 136 on the spool 160 causes the spool head 164 to bottom out against the head cap 170.

When the abrupt force is removed, the bias mount returns the direction control valve 140 to its normal position.

In one embodiment, the control module 112 cooperates with a Global Positioning System (GPS) and is configured to access a desired downforce prescription map for setting and/or modifying the desired downforce Fd as the air seeder traverses the field.

The downforce prescription map may be based upon soil types, elevations, tillage practices, irrigation plots, or other location-specific preferences set by the operator prior to operation.

In such an embodiment, the control module 112 may be used to specify a different desired downforce Fd to each row unit or groups of row units to more accurately follow the downforce prescription map.

For example, if the locations of the far right row unit and the far left row unit on the planter correspond to different prescribed desired downforces Fd based on soil type or other predefined factor, the control module 12 is preferably capable of setting the appropriate desired downforce Fd for each of the air seeder row unit 10.

In addition, the control module 112 is preferably configured to determine and display a ground contact percentage as disclosed in applicant's International Patent Publication No. WO2009/042238.

The control module 112 is preferably configured to allow the operator to select a desired minimum ground contact percentage in addition to, or rather than, inputting a specific desired downforce Fd.

In such an embodiment, the desired downforce Fd would be the desired minimum ground contact percentage.

The dynamic system 100 would adjust the supplemental downforce until the actual downforce Fa in relation to the desired downforce Fd resulted in the desired minimum ground contact percentage over the sampling period.

Thus, as used herein, the term "desired downforce Fd" should be understood to include a force that may be expressed as a numerical value or as a percentage of ground contact.

It should be appreciated that when the air seeder is raised, the firming implement support arm 50 and the closing wheel support arm 60 will pivot downwardly resulting in the firming implement load sensor 53 or closing wheel load sensor 63 to sense zero or near zero actual downforce Fa, which in turn will result in fluid flow to the firming implement actuator 55 or closing wheel force actuator 65.

To prevent such a result from occurring, the transport position detector 300 is preferably in electrical communication with a valve 310 disposed along the fluid supply line 122c.

When the detector 300 detects that the air seeder is in a transport position, the valve 310 is closed to prevent the flow of fluid from the fluid source 130 to the fluid inlet ports 150 of the direction control valves 140 of the row units 10.

The valve 310 is preferably a two-position normally open solenoid valve.

Alternatively, instead of a separate valve 310 disposed in the fluid supply line 122c, the transport position detector 300 may be in electrical communication with the pilot pressure control valve 114 such that when the air seeder is raised into the transport position, the transport position detector 300 sends a signal to cause the pilot pressure control valve 114 to close.

In such an event the firming implement force actuator 55 or closing wheel force actuator 65 will automatically "raise" in an effort to rebalance the load between Fd and Fa, by allowing fluid to flow through the direction control valve 140 as indicated in FIG. 5C or 6C, because Fd will be zero when the pilot pressure control valve 114 is closed.

When the firming implement load sensor 53 or closing wheel load sensor 63 senses zero when the gauge wheels are raised above the soil such that Fd=Fa, the direction control valve 140 will return to the position illustrated in FIG. 5A or 6A preventing fluid flow to the firming implement actuator 55 or closing wheel force actuator 65.

Furthermore, it should be understood that the pilot pressure control valve 114 and the control module 112 may be combined into a single manually operated pressure regulating valve, or the pilot pressure control valve 114 can be replaced by a direct acting pressure valve. In such an embodiment, the manually operated pressure regulating valve would preferably include labels or markers relating each pressure setting to the reaction force.

In the same embodiment, the output pilot pressures corresponding to the desired downforce Fd would also be set manually.

Such an embodiment is shown in FIG. 7, which illustrates a portion of the closed-loop feedback circuit 110 wherein control module 112 and the pilot pressure valve 114 are replaced by a manually operated pressure regulating valve 400.

The valve 400 includes a controller 402 such as a dial or knob, and settings 404 corresponding to the desired downforce Fd, which may be indicated in pounds force as illustrated or in any other desired units.

Figure 8:
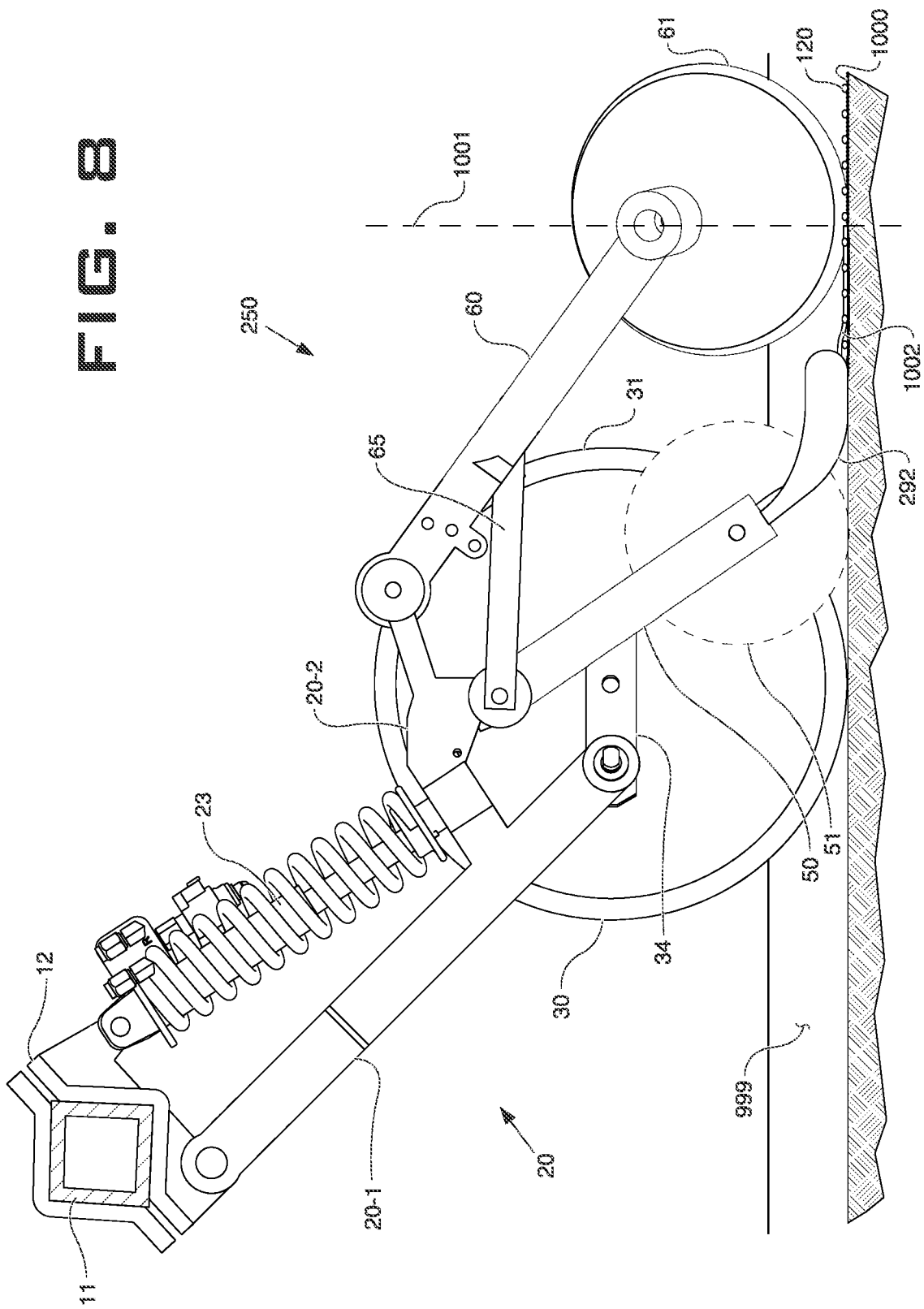
FIG. 8 illustrates an embodiment of a trench closing sensor and a reference sensor disposed on an air seeder row unit.

FIG. 8 illustrates a trench closing sensor 1000 to determine if the closing wheel 61 is sufficiently closing the open seed trench 999 with soil and/or to determine the amount of compaction of the soil over the seed within the seed trench 999. The trench closing sensor is more fully described in International application No. PCT/US2017/032426. The trench closing sensor 1000 comprises wire, string or other suitable elongate member (hereinafter referred to as the "drag wire" 1002) disposed to drag in the seed trench 999. Generally, as the open seed trench 999 and drag wire 1002 are covered with soil by the closing wheel 61 during planting operations, the trench closing sensor 1000 measures or detects whether the seed trench is being adequately closed with soil by measuring the amount of force required to pull the wire through the soil or by measuring the amount of strain, pulling force or tension in the wire or by measuring the amount of soil pressure acting on the wire.

To adequately measure or detect if the seed trench is being adequately closed with soil, the end of the drag wire may terminate proximate to the vertical axis 1001 extending through the center of the closing wheel 61 or several inches rearward of the vertical axis 1001.

The drag wire 1002 may be supported by any suitable structure that permits the rearward end of the drag wire 1002 to drag within the seed trench 999. As illustrated in FIG. 8, one such appurtenance 292 may be a seed firmer, such as a Keeton® seed firmer, which is known in the art and available from Precision Planting, LLC, 23207 Townline Rd, Tremont, Ill. 61568.

FIG. 9 is an embodiment of Keeton seed firmer appurtenance 292 adapted to function as trench closing sensor 1000. In this embodiment, the plastic body 1004 of the Keeton seed firmer 292 includes a cavity 1006 formed within the body. The rearward end of the drag wire 1002 extends outwardly from the rear of the body 1004 through an aperture 1008. The forwarded end of the drag wire 1002 may be coupled to an instrument 1010 (such strain gauge, a Hall effect sensor or a potentiometer) disposed within the cavity 1006. The signals generated by the instrument 1010, are communicated to the monitor 300 by signal wires 1014.

In use, as the air seeder row unit 10 travels forwardly, the closing wheel 61 closes the open seed trench 999 by pushing the walls of the seed trench 999 back together over the deposited seed and the drag wire 1002. As the drag wire 1002 is pulled through the soil of the closed seed trench, the instrument 1010 measures the strain on the drag wire 1002, or the amount of pulling force or tension exerted on the drag wire 1002. It should be appreciated that if the seed trench 999 is optimally closed producing good seed-to-soil contact, the instrument 1010 will measure a greater strain, tension or pulling force than if the seed trench is poorly closed. Likewise, the instrument 1010 can detect if the closing wheel 61 is excessively compacting the soil or inadequately packing the soil depending on the strain, tension or pulling force required to pull the drag wire 1002 through the closed trench.

Rather than measuring the pulling force or tension in the wire, FIG. 10 illustrates an embodiment in which a pressure transducer 1012, such as a piezoresistive or piezoelectric transducer, is coupled to the rearward end of the drag wire 1002 to measure the pressure being exerted on the transducer 1012 by the surrounding soil pushed into the seed trench 999 by the closing wheel 61. The pressure detected by the transducer 1012 is communicated by signal wires 1014 to the monitor 300. It should be appreciated that the more soil pushed into the seed trench 999 by the closing wheel 61, the more soil covers the transducer 1012 generating a higher pressure measurement. Conversely, if the closing wheel assembly is not pushing a sufficient amount of soil into the seed trench to adequately cover the seed, the transducer 1012 will measure a lower pressure.

FIG. 11 illustrates another embodiment in which multiple drag wires 1002A, 1002B, 1002C are stacked vertically, each coupled to a respective instrument 1010A, 1010B, 1010C (e.g., a strain gauge, a hall effect sensor or a potentiometer) disposed within the cavity 1006 so as to provide a profile perspective of the trench closure. It should be appreciated that rather than three drag wires as illustrated in FIG. 10, there may be only two stacked drag wires or more than three stacked drag wires. Additionally, it should be appreciated that each of the stacked drag wires 1002 may be instrumented with a pressure transducer as described above or one of more of the stacked wires may be instrumented with a pressure transducer while other wires are coupled to an instrument 1010 disposed within the cavity 1006.

Referring again to FIG. 14, the signals generated by the trench closing sensor 1000 may be communicated by signal wires 1014 to the monitor 300 which may be programmed to convert and display on the monitor screen the actual force, tension or pressure measured by the sensor 1000 in the seed trench 999 in relation to a desired force, tension or pressure range. If the desired displayed force, tension or pressure is outside the desired range, the downforce on the closing wheel 61 may be adjusted. The adjustment of the closing wheel downforce may be adjusted manually by adjusting the position of a conventional coil spring corresponding to discrete preload settings. Alternatively, if the closing wheel 61 is equipped with trench closing wheel assembly actuator 256 as previously described, the operator may manually actuate the trench closing wheel assembly actuator 256 as needed to increase or decrease the amount of downforce exerted by the closing wheels 61 to keep the force, tension or pressure measured by the trench closing sensor 1000 within the desired range. Alternatively, the monitor 300 may be programmed to automatically actuate the trench closing wheel assembly actuator 256 to increase or decrease the downforce on the closing wheel 61 depending on whether the trench closing sensor 1000 detects that the force, tension or pressure on the drag wire(s) 1002 falls below or exceeds a predefined minimum and maximum threshold force, tension or pressure. In yet another embodiment, rather than adjusting the downforce on the closing wheel 61 via a conventional coil spring or actuator, the angle of the closing wheels may be adjusted to increase or decrease the aggressiveness of the closing wheels. For example, as is known in the art, an actuator or mechanical adjustment (not shown) may be provided to decrease or increase the angle of the closing wheels with respect to the direction of travel or with respect to vertical thereby adjusting the amount of soil the closing wheels push into the seed trench. If a closing wheel angle actuator is provided to adjust the closing wheel angle, the operator may actuate the actuator manually or the monitor 300 may be programmed to automatically actuate the actuator to adjust the aggressiveness of the closing wheels depending on the force, tension or pressure detected by the trench closing sensor 1000.

Figure 12:
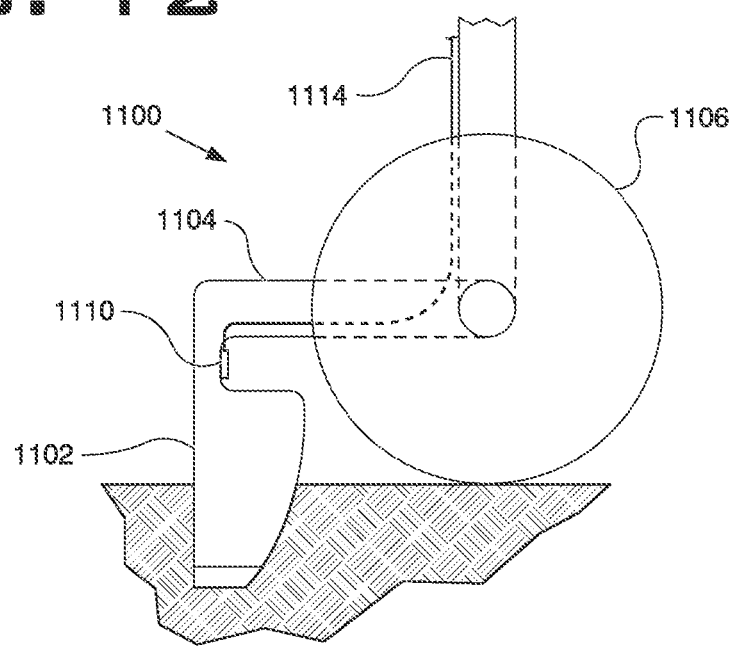
FIG. 12 is an enlarged side elevation view of an embodiment of a reference sensor.
Figure 13:
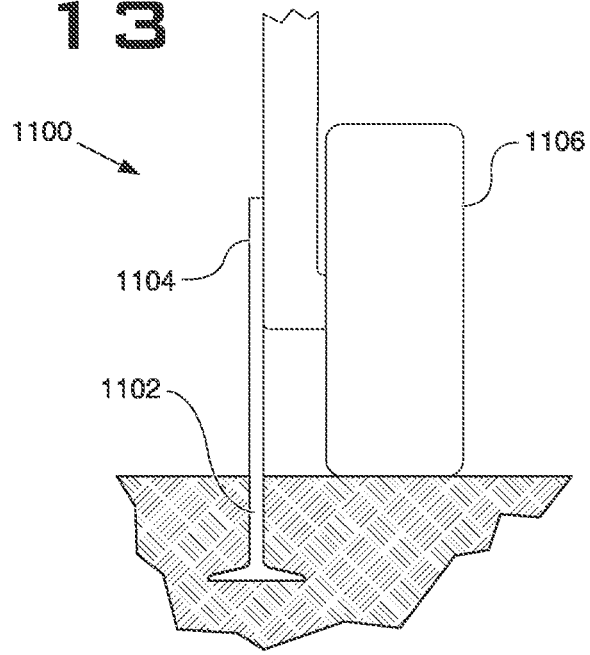
FIG. 13 is a rear elevation view of the reference sensor of FIG. 7 in accordance with one embodiment.

A reference sensor 1100 (FIGS. 11, 12, and 13) may be provided to "calibrate" the trench closing sensor 1000 to account for conditions that may have an effect on the drag coefficient properties of the soil, including such factors as planter speed, trench depth, soil texture, soil moisture, soil density and closing system type. As best illustrated in FIGS. 12 and 13, the reference sensor 1100 includes a drag member 1102 which is disposed to drag through the soil outside of the seed trench 999. The drag member 1102 is supported by an arm 1104 which is adjustably positionable with respect to a gauge wheel 1106 to vary the penetration depth of the drag member 1102 with respect to the soil surface. The arm 1104 is instrumented with a strain gauge 1110 to detect the strain exerted on the arm 1104 as the drag member 1102 drags through the soil. Signal wires 1114 transmit the electrical resistance change in the strain gauge 1110 to the monitor 300. The monitor 300 is programmed to correlate the electrical resistance change to detected strain in the arm 1104 which can then be correlated with the signals generated by the trench closing sensor 1000 to define the range of the force, tension or pressure that the trench closing sensor 1000 should be detecting if the seed trench is being adequately closed by the closing wheel 61.

Figure 14:
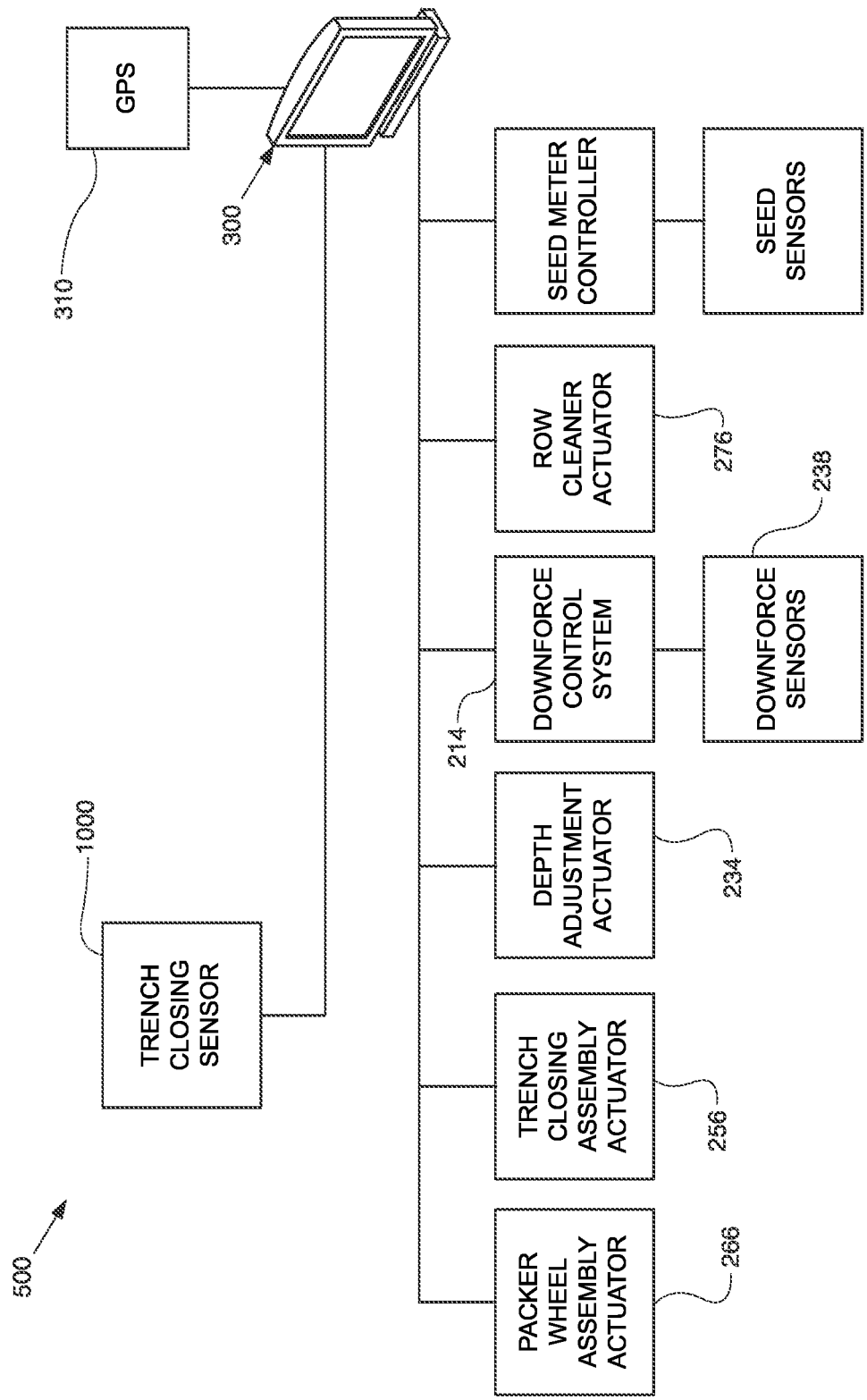
FIG. 14 is a diagram of a system for implementing operational control of the closing wheel assembly and packer wheel assembly based on signals generated by the trench closing assembly in accordance with one embodiment.
Figure 15:
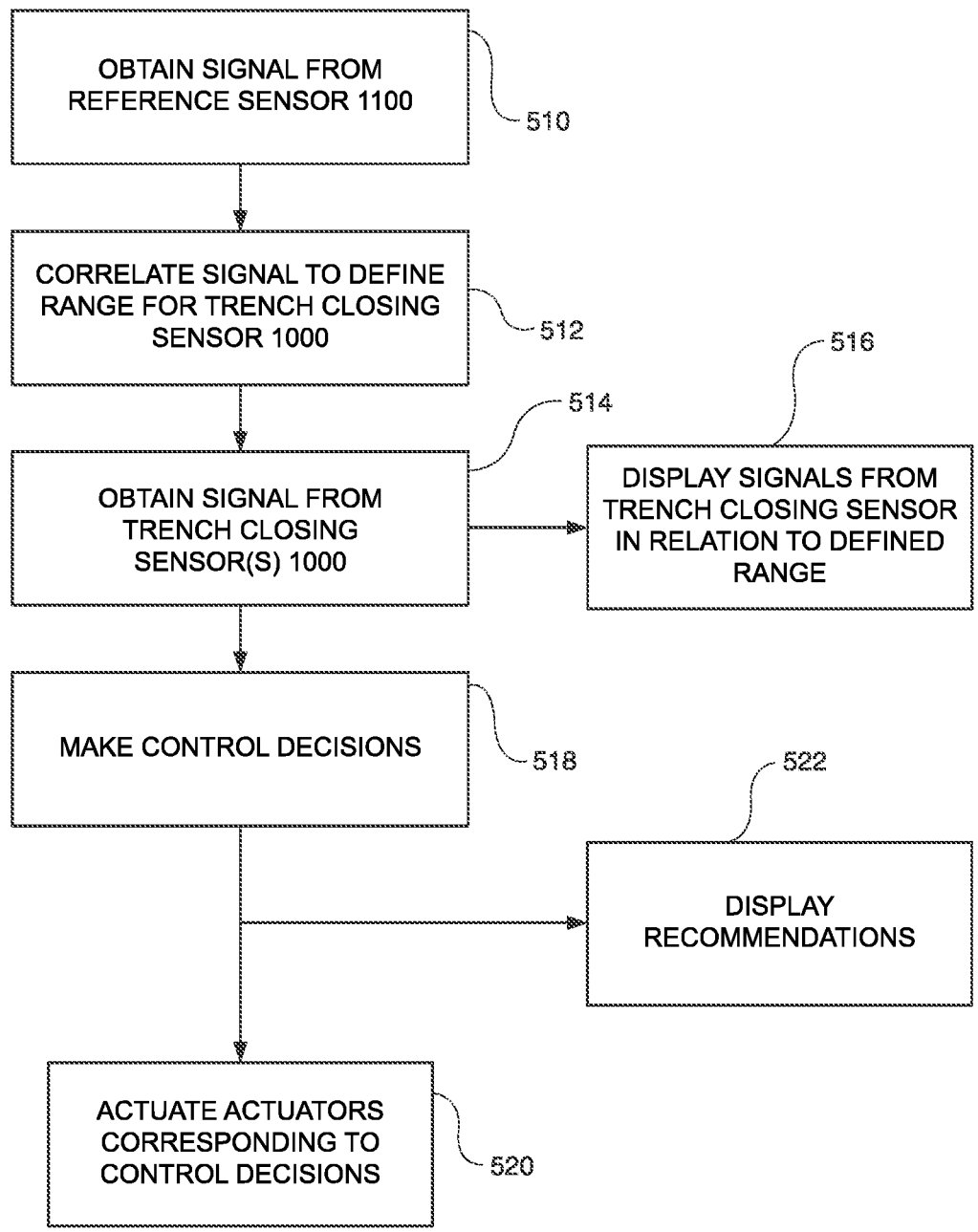
FIG. 15 is a flow chart illustrating an embodiment for implementing operational control and operator feedback based on the references sensor and trench closing sensor.

FIG. 14 is a schematic illustration of a system 500 which employs the trench closing sensors 1000 and reference sensors 1100 to provide operator feedback and to control the closing wheel 61 of the air seeder row unit 10. At steps 510 and 512 of FIG. 15, the reference sensor 1100 detects the strain (via the strain gauge 1110) exerted on the arm 1104. At step 512, the strain exerted on the arm 1104 is correlated to define the range of force, tension or pressure that should be detecting if the seed trench is being adequately closed by the closing wheel 61. At step 514 the trench closing sensor 1000 detects the force, tension or pressure exerted by the soil on the drag wire(s) 1002. At step 516 the force, tension or pressure exerted by the soil on the drag wire(s) 1002 of the trench closing sensor 1000 may be displayed to the operator on the monitor 300 in the cab of the tractor in relation to the correlated range of the force, tension or pressure that the trench closing sensor 1000 should be detecting if the seed trench is being adequately closed by the closing wheel 61. At step 518, control decisions are made based on the comparison of the characterized range with the force, tension or pressure detected by that the trench closing sensor 1000. At step 520, the closing wheel 61 may be controlled by the monitor 300 generating signals to actuate one or more of the corresponding actuators 256, 266 and/or at step 522, corresponding recommendations may be displayed to the operator on the monitor display.

What is claimed is:

1. A seeding implement comprising:
   a bracket for mounting the seeding implement to a frame;
   a support arm pivotally connected to the bracket and having a support arm first portion and a support arm second portion branched from the support arm first portion;
   a furrow disc connected to the support arm first portion;
   a force device connected to the bracket and connected to the support arm second portion to apply a force between the frame and the furrow disc;
   an implement support arm pivotally connected to a first pivot of the support arm second portion at a first end of the implement support arm; and
   an implement force actuator pivotally connected to a second pivot of the support arm second portion at a first end of the implement force actuator and connected to the implement support arm at a second end of the implement force actuator, wherein the implement force actuator is selected from the group consisting of a hydraulic cylinder, a pneumatic cylinder, and an electrically driven linkage.

2. The seeding implement of claim 1, further comprising a closing wheel support arm pivotally connected to the support arm second portion at the second pivot.

3. The seeding implement of claim 2, further comprising a closing wheel force actuator pivotally connected to the support arm second portion at a first end of the closing wheel force actuator and connected to the closing wheel support arm at a second end of the closing wheel force actuator, wherein the closing wheel force actuator is selected from the group consisting of a hydraulic cylinder, a pneumatic cylinder, and an electrically driven linkage.

4. The seeding implement of claim 1, further comprising:
   a gauge wheel connected to the support arm first portion via a gauge wheel arm at an axle; and
   a gauge wheel load sensor disposed at the connection of the support arm first portion and the gauge wheel arm or at a connection of the gauge wheel arm and the axle.

5. The seeding implement of claim 1, further comprising:
a gauge wheel connected to the support arm first portion via a gauge wheel arm at an axle;
a load sensor disposed on the gauge wheel arm at an end opposite of the axle.

6. The seeding implement of claim 1, further comprising an implement load sensor disposed at the connection of the implement to the implement support arm.

7. The seeding implement of claim 1, further comprising an implement load sensor disposed on the implement support arm.

8. The seeding implement of claim 3, further comprising a closing wheel load sensor on the closing wheel support arm.

9. The seeding implement of claim 3, further comprising a closing wheel load sensor disposed at the connection of the closing wheel to the closing wheel support arm.

10. A seeding implement comprising:
a support arm having a support arm first portion and a support arm second portion branched from the support arm first portion;
a closing wheel support arm pivotally mounted to the support arm second portion at a first end of the closing wheel support arm, and a closing wheel connected to the closing wheel support arm at a second end of the closing wheel support arm;
a closing wheel force actuator pivotally connected to the second support arm at a first end of the closing wheel implement force actuator and connected to the closing wheel support arm at a second end of the closing wheel force actuator, wherein the closing wheel force actuator is selected from the group consisting of a hydraulic cylinder, a pneumatic cylinder, and an electrically driven linkage;
a firming implement support arm pivotally connected to the support arm second portion at a first pivot at a first end of the firming implement support arm; and
a firming implement load sensor disposed on the firming implement support arm.

11. The seeding implement of claim 10, further comprising:
a gauge wheel connected to the support arm first portion; and
a gauge wheel load sensor disposed at the connection of the support arm first portion and the gauge wheel.

12. The seeding implement of claim 10, further comprising:
a gauge wheel connected to the support arm first portion via a gauge wheel arm at an axle; and
a gauge wheel load sensor disposed at the connection of the support arm first portion and the gauge wheel arm.

13. The seeding implement of claim 10, further comprising:
a gauge wheel connected to the support arm first portion via a gauge wheel arm at an axle; and
a gauge wheel load sensor disposed at a connection of the gauge wheel arm and the axle.

14. The seeding implement of claim 10, further comprising:
a gauge wheel connected to the support arm first portion via a gauge wheel arm at an axle; and
a load sensor disposed on the gauge wheel arm at an end opposite of the axle.

15. The seeding implement of claim 10, further comprising:
a firming implement connected to the firming implement support arm at a second end of the firming implement support arm;
wherein the firming implement load sensor is disposed at the connection of the firming implement to the firming implement support arm.

16. The seeding implement of claim 10, further comprising a closing wheel load sensor on the closing wheel support arm.

17. The seeding implement of claim 10, further comprising:
a downforce control system having a closed-loop feedback circuit to communicate with the closing wheel force actuator to automatically control downforce of the closing wheel force actuator.

18. A seeding implement comprising:
a support arm having a support arm first portion and a support arm second portion;
a firming implement support arm pivotally connected to the support arm second portion at a first pivot at a first end of the firming implement support arm;
a firming implement load sensor on the firming implement support arm; and
a firming implement force actuator pivotally connected to the support arm second portion at a first end of the firming implement force actuator and connected to the firming implement support arm at the second end of the firming implement force actuator, wherein the firming implement force actuator is selected from the group consisting of a hydraulic cylinder, a pneumatic cylinder, and an electrically driven linkage.

* * * * *